Oct. 22, 1957      H. S. TAYLOR      2,810,606
LIQUID FERTILIZER CALIBRATING DEVICE
Filed Aug. 30, 1956      2 Sheets-Sheet 1
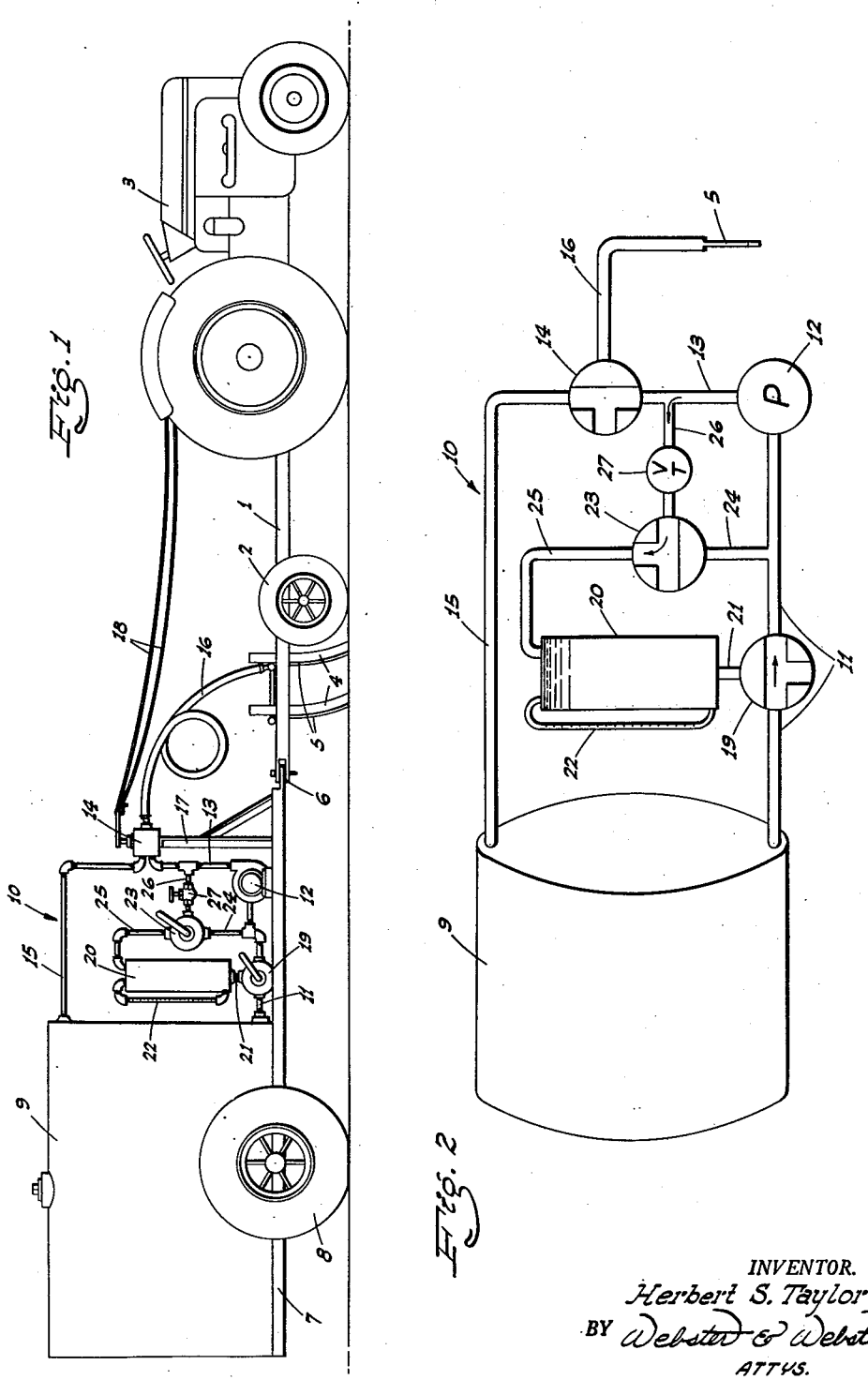
INVENTOR.
Herbert S. Taylor
BY Webster & Webster
ATTYS.

Oct. 22, 1957 H. S. TAYLOR 2,810,606
LIQUID FERTILIZER CALIBRATING DEVICE
Filed Aug. 30, 1956 2 Sheets-Sheet 2

INVENTOR.
Herbert S. Taylor
BY Webster & Webster
ATTYS.

United States Patent Office 2,810,606
Patented Oct. 22, 1957

2,810,606

LIQUID FERTILIZER CALIBRATING DEVICE

Herbert S. Taylor, Woodland, Calif.

Application August 30, 1956, Serial No. 607,186

6 Claims. (Cl. 299—46)

This invention relates in general to tractor-pulled apparatus of the type used to introduce liquid fertilizer continuously into the ground, and more particularly to apparatus—for the purpose—which includes a liquid pumping and valve regulated flow control system adapted to deliver the liquid fertilizer from a supply tank to a below-ground nozzle.

In the use of the apparatus, as above, it is difficult for the operator to ascertain the amount of liquid fertilizer being fed into the ground for any given length of travel, with the result that less than needed—or an excessive, and consequent uneconomical amount—may be applied.

It is therefore the major object of this invention to provide, in the liquid pumping and flow control system of the apparatus, a novel calibrating device by means of which the operator can accurately determine the output of the system, so that it may thereafter be regulated if necessary.

It is also an object of the invention to provide a liquid fertilizer calibrating device which is designed for ease and economy of manufacture, ready installation, and convenience of use.

Still another object of the invention is to provide a practical and reliable liquid fertilizer calibrating device, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the apparatus as coupled to a tractor; the calibrating device being shown as incorporated in the liquid pumping and valve regulated flow control system.

Fig. 2 is a diagrammatic view of such system showing the setting of the valves for the purpose of filling the calibrating tank.

Figure 3:
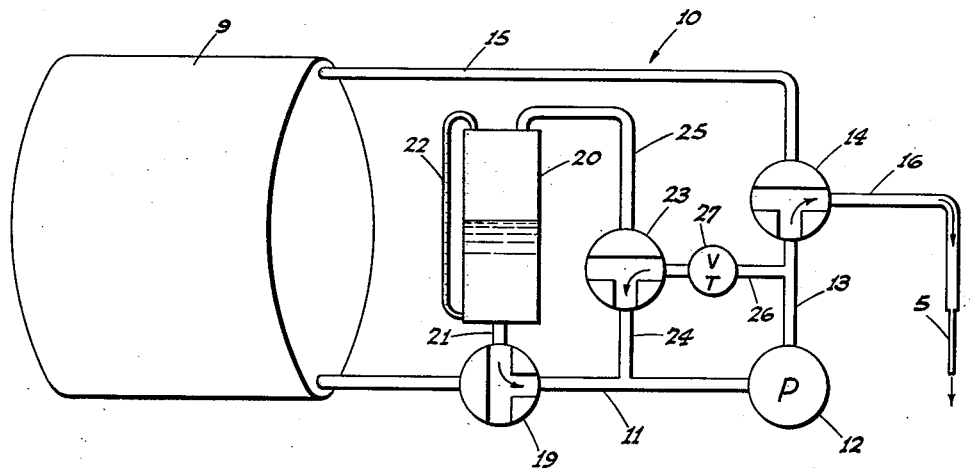
Fig. 3 is a similar view, but shows the setting of the valves during a calibrating run.

Referring now more particularly to the drawings, and to the characters of reference marked thereon, the apparatus, in connection with which the present invention is used, includes generally a draft frame 1 supported by wheels 2, and coupled in draft relation to a tractor 3. The draft frame 1 carries one or more ground penetrating shoes 4, behind each of which is mounted a nozzle tube 5; the nozzle tubes extending into the ground behind the shoes 4 for the purpose of feeding liquid fertilizer below the ground level.

The liquid fertilizer is delivered under pressure to the nozzle tubes in the manner as will hereinafter appear.

At its rear end the draft frame 1 is hitched, as at 6, to the forward end of a trailer 7 which includes wheels 8. The rear portion of the trailer 7 supports a liquid fertilizer supply tank 9, and ahead of said tank the trailer carries a liquid pumping and valve-regulated flow control system, indicated generally at 10.

The system 10 comprises a liquid fertilizer supply conduit 11 which leads forwardly from a low point on the tank 9, and such conduit 11 connects, at the opposite end, to the intake side of a power-driven pump 12; the drive not being shown, but which may be of any conventional type, such as a power take-off unit connected to the tractor.

An output conduit 13 leads from the discharge side of the pump 12 to one side of a three-way valve 14 whose other side connects to a return conduit 15 which leads back to the tank 9 at the top of the latter. The lateral or remaining side of the three-way valve 14 is in communication with a flexible conduit or feed hose 16, whose outer end is attached by suitable couplings and piping to the nozzle tubes 5. The nozzle tubes are, as shown, of relatively small diameter, or of restricted passage size in relation to the hose 16.

The three-way valve 14 is mounted on a post 17 which upstands from the front of the trailer 7, and said valve 14 is controlled or selectively set to its respective positions by means of an arrangement which includes pull cords 18 leading forwardly to the tractor 3 for manipulation by the operator of such tractor. The power-driven pump 12 is mounted on the trailer 7 immediately to the rear of said post 17.

Another three-way valve 19 is interposed in the supply conduit 11, with the lateral of such valve connected in communication with the bottom of an upstanding calibrating tank 20 by means of a bottom outlet pipe 21; such calibrating tank including a sight gauge 22 which communicates from top to bottom of said tank; such sight gauge having suitable calibrations thereon.

Still another three-way valve 23 is employed in the system, with opposite sides of such valve interposed in a tank-feed conduit unit comprising pipes 25 and 25, and with the lateral side of such valve connected to a pipe 26. The pipe 24 leads from valve 23 to communication with supply conduit 11 between the valve 19 and pump 12, while pipe 25 leads to the top of the calibrating tank 20. The pipe 26 leads from the valve 23 to communication with the output conduit 13 between the pump 12 and valve 14; there being a throttle or calibrating valve 27 interposed in said pipe 26. All of the described valves are of manual type.

In operation of the apparatus, and as it is pulled forwardly by the tractor 3, the described liquid pumping and flow control system 10 normally delivers liquid fertilizer from the tank 9, through the feed hose 16, and into the restricted nozzle tubes 5, and from which tubes the liquid fertilizer is introduced into the ground.

At the outset, and in order that the operator may ascertain the amount of liquid fertilizer being delivered into the ground for any given length of travel, the valves of the described system are set in the manner shown in Fig. 2.

More specifically, the valve 14 is set so that it is closed relative to the feed hose 16, the valve 19 is set so that it is open relative to the supply conduit 11, but closed as to the bottom outlet pipe 21; and the valve 23 is set so that it is open between pipes 25 and 26, but closed as to pipe 24.

Thereafter, with the pump 12 running, liquid fertilizer is fed from supply conduit 11, through output conduit 13 and pipe 26 to valve 23, and thence continues through pipe 25 into the calibrating tank 20 to fill the latter.

After the calibrating tank 20 has been filled, the valves are reset, as shown in Fig. 3, and wherein valve 14 establishes communication between output conduit 13 and feed hose 15, but is closed relative to the return conduit 15; the valve 19 is open only between the bottom outlet pipe 21 and the portion of supply conduit 11 which leads from said valve 19 to pump 12; and valve 23 is open between pipes 26 and 24, but closed relative to pipe 25.

With this setting of the valves, a calibrating run is begun and during which run only the liquid fertilizer from the tank 20 is fed into the ground, so that for a given length of travel the operator—by reading the sight gauge 22—can ascertain the amount of liquid fertilizer applied into the ground during such length of travel.

If the amount of fertilizer delivered into the ground during the calibrating run is more or less than desired, such amount is regulated by adjustment of the valve 27.

It will be recognized that the valve 27 is in effect a bypass control valve; this for the reason that a certain amount of the liquid fertilizer under pressure continuously bypasses through pipes 26 and 24 back to the supply conduit 11, and which bypassing is occasioned by the fact that the nozzle tubes 5 are restricted and create at all times a back pressure in the feed hose 16.

Figure 4:
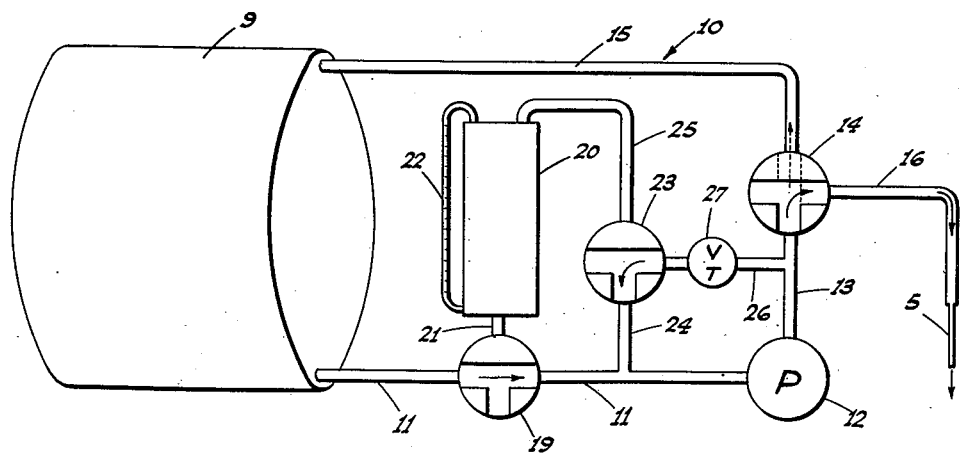
Fig. 4 is likewise a similar view, but shows the setting of the valves on a normal run, with the calibrating device out of circuit.

After the calibrating run (or runs) has been made, and valve 27 adjusted as necessary, the valves of the system are then set as shown in Fig. 4; valve 14 being open between output conduit 13 and feed hose 16, but closed relative to return conduit 15; valve 19 being open in supply conduit 11, but closed as to bottom outlet pipe 21; and valve 23 being open between pipes 26 and 24, but closed as to pipe 25.

Thereafter, as the apparatus is pulled forwardly by the tractor (the throttle or calibrating valve 27 remaining set, as per the calibrating run), liquid fertilizer is delivered by the system 10 from the tank 9 to the hose 16 and out of the nozzle tubes 5 in a known and regulated amount for any given length of travel. In this manner the operator can introduce into the ground exactly the correct amount of liquid fertilizer needed.

If it is desired to shut off the feed of the liquid fertilizer to the nozzle tubes 5—as, for example, when making turns at the end of a field—the operator, by manipulating the pull cords 18, sets the valve 14 so that it is open between output conduit 13 and return conduit 15, but closed relative to feed hose 16 as shown by the dotted-line position in Fig. 4; the liquid fertilizer then merely returning to the tank 9.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful and upon which Letters Patent are desired:

1. In apparatus, for introducing a liquid fertilizer into the ground, which includes a supply tank, a driven pump, a delivery nozzle, and a conduit assembly normally connecting the supply tank to the pump and the latter to said nozzle whereby to feed liquid fertilizer thereto; a liquid fertilizer calibrating device comprising a separate tank having calibration means, a first conduit means connecting between the top of the separate tank and the conduit assembly at a point intermediate the pump and nozzle, said first conduit means including a valve having an open and a closed position relative to the separate tank, and a second conduit means connecting between the bottom of the separate tank and the conduit assembly at a point intermediate the supply tank and pump, said second conduit means including a valve adapted to place the separate tank, or the supply tank, alone in communication with said conduit assembly, selectively.

2. In apparatus, for introducing a liquid fertilizer into the ground, which includes a supply tank, a driven pump, a delivery nozzle, and a conduit assembly normally connecting the supply tank to the pump and the latter to said nozzle whereby to feed liquid fertilizer thereto; there being bypass conduit means connected in said conduit assembly in parallel to the pump, and an adjustable valve in said bypass conduit means; a liquid fertilizer calibrating device comprising a separate tank, means arranged with said separate tank to indicate liquid level therein, a three-way valve connected on two sides into the bypass conduit means beyond the adjustable valve in the direction of flow, a pipe connected between the remaining side of the three-way valve and the top of the separate tank, another three-way valve connected on two sides into the conduit assembly between the bypass conduit means and supply tank, and a pipe connected between the remaining side of said other three-way valve and the bottom of said separate tank.

3. In apparatus, for introducing a liquid fertilizer into the ground, which includes a supply tank, a driven pump, a delivery nozzle, a first conduit connected between the supply tank and the intake of the pump, a second conduit connected between the discharge of the pump and the nozzle, a third and bypass conduit connected between said first and second conduits in parallel to the pump, an adjustable valve in the bypass conduit, the nozzle being relatively restricted, a three-way valve connected on two sides into the bypass conduit between the adjustable valve and said one conduit, a separate tank a fourth conduit connected between the remaining side of said three-way valve and the top of the separate tank, another three-way valve connected on two sides into said one conduit between the supply tank and the bypass conduit, and a fifth conduit connected between the remaining side of said other three way valve and the bottom of the separate tank.

4. A device, as in claim 3, including a third three-way valve connected on two sides into said second conduit between the bypass conduit and nozzle; there being a return conduit connected between the remaining side of said third three-way valve and the supply tank.

5. Apparatus for introducing a liquid fertilizer into the ground comprising a supply tank, a driven pump, a supply conduit leading from the tank to the intake of the pump, an output and return conduit unit leading from the discharge side of the pump to the tank, a delivery nozzle operatively connected to the output conduit, a separate tank having liquid calibrating means, a second conduit unit leading from the supply conduit to the separate tank, a first control valve interposed in said second conduit unit, a second control valve interposed between the output and return conduits and the nozzle, said second valve being arranged to selectively establish communication between the output conduit and the nozzle while shutting off the return conduit, and between the output conduit and the return conduit while shutting off the nozzle, a lateral pipe connected to the output conduit and leading to the first valve, the latter being arranged to selectively establish communication between said lateral pipe and the separate tank and between said pipe and the supply conduit, a third valve interposed in the supply conduit between the supply tank and the point of connection of the second conduit unit with the supply conduit, and a bottom outlet pipe depending from the separate tank and connected to the third valve; said third valve being arranged to selectively allow of an unbroken flow through the supply pipe from the supply tank to the pump, or to establish communication between said bottom outlet pipe and the pump while shutting off the supply tank from the pump.

6. Apparatus, as in claim 5, with an adjustable throttle valve in the lateral pipe.

References Cited in the file of this patent
UNITED STATES PATENTS

| | | |
|---|---|---|
| 348,564 | Lewis et al. | Sept. 7, 1886 |
| 1,280,855 | Rowland et al. | Oct. 8, 1918 |
| 2,509,627 | Bickerton | May 30, 1950 |
| 2,731,901 | Tye | Jan. 24, 1956 |